Sept. 16, 1958  D. H. MOORE  2,852,032
CHEMICAL INJECTOR
Filed Sept. 17, 1956
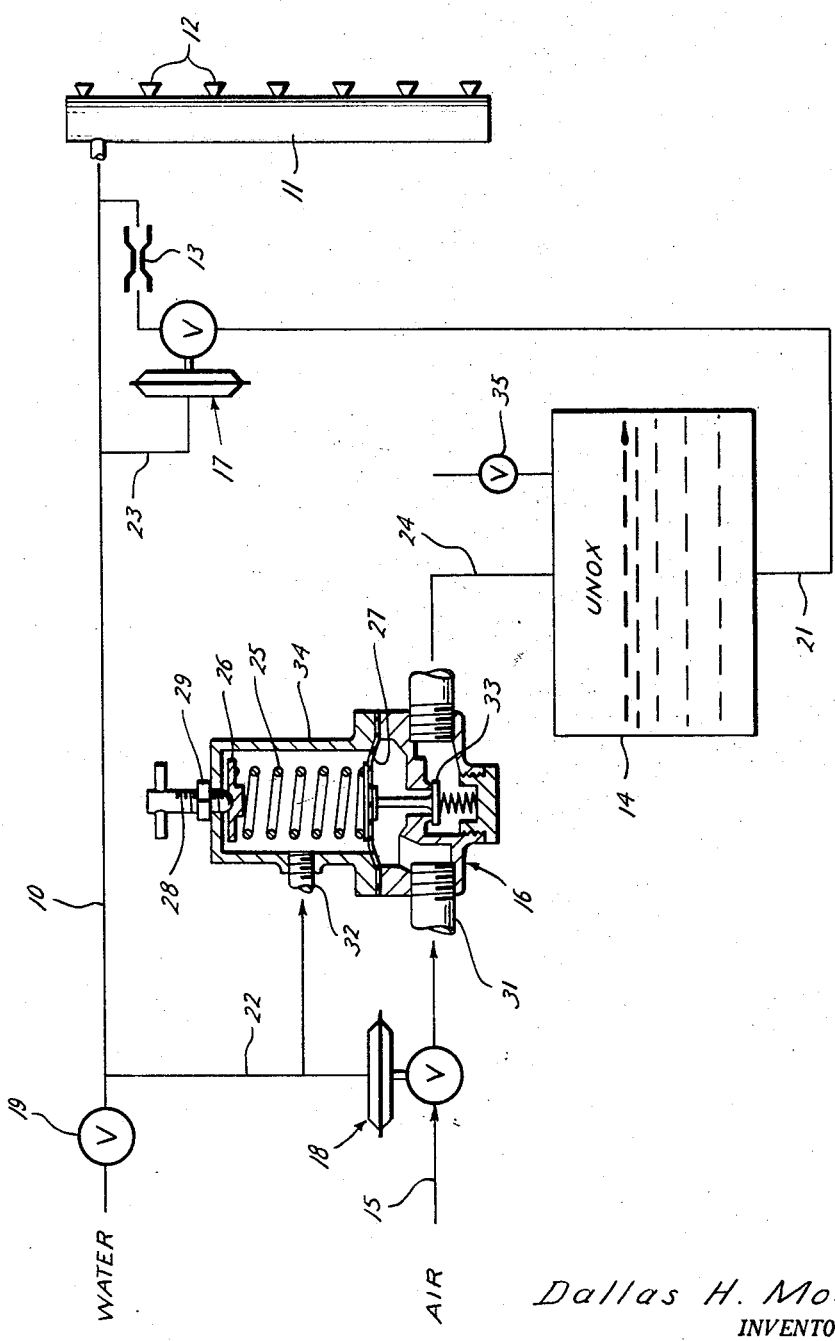
Dallas H. Moore
INVENTOR.
BY
Browning Simmons Hyer
ATTORNEYS.

United States Patent Office 2,852,032
Patented Sept. 16, 1958

2,852,032

CHEMICAL INJECTOR

Dallas H. Moore, Houston, Tex., assignor to McFarland Manufacturing Corporation, Houston, Tex., a corporation of Texas Application September 17, 1956, Serial No. 610,226

5 Claims. (Cl. 137—98)

This invention relates to a chemical injector system for injecting a chemical into a stream and more particularly to a system which is well adapted for injecting a foam-making chemical into a stream of water which chemical and water when properly mixed provide a fire fighting and preventing foam.

Fire fighting and preventing foam formed by a mixture of water and chemical is becoming increasingly prominent both in fire fighting and fire prevention. The mixture of water and chemicals with the latter in a very small percentage are sprayed through special nozzles in which the mixture is aerated to form a foam as it leaves the nozzle and is sprayed onto an area. Systems of this sort are installed in areas in which the possibility of fire is a serious problem. Frequently, the systems are installed with manifolds so arranged that a spray from a group of manifolds will blanket an entire area. Thus, when fire breaks out, not only is the foam sprayed on the fire, but it is also sprayed over adjacent areas to prevent spread of the fire. One outstanding example of this type of system is to be found in tank farms in which highly inflammable fluids are stored.

The quality foam obtained from the systems depends upon the pressure of the water and upon the percentage of foam-making chemical mixed with the water. The water pressure may vary considerably and the back-pressure of water on the chemical injection system will materially influence the amount of chemical injected. For instance, in some plants, water pressure of 50 or 60 lbs. will normally be maintained. However, upon fire breaking out, an auxiliary pump is placed on stream and water pressure may be as much as doubled by this pump. Thus, the chemical injection system should be such as to automatically proportion chemical into the water stream and to accommodate a substantial variance in water pressure.

The foam-making chemicals are quite expensive. As they are stored in a state of readiness at all times, it is desired to use as small an amount of foam-making chemical and therefore reservoir equipment as possible.

It is desirable to have the chemical injection system operate only when water is flowing through the mains leading to the spray head manifolds as otherwise it is wasted.

It is an object of this invention to provide a chemical injection system which may be used for injecting chemical into a water line for making foam in which differences in pressure in the line into which the chemical is injected are automatically compensated for so that a constant volume of chemical is injected into the line regardless of the line pressure.

Another object is to provide a chemical injection system in which chemical is injected only when there is fluid flow within the line into which chemical is to be injected; the starting and stopping of the chemical injection apparatus being controlled by the fluid in the line into which chemical is to be injected.

A more specific object is to provide a chemical injection system in which chemical is driven by a fluid under pressure through a metering orifice into a line and in which the pressure differential across the metering orifice is maintained constant notwithstanding changes in either the driving pressure fluid for the chemical or changes in the pressure in the line into which the chemical is being injected.

Other objects, features and advantages of this invention will be apparent from the drawing, specification and the claims.

In the drawing, the single figure is a schematic illustration of a chemical injection system embodying this invention.

The line 10 into which chemical is to be injected extends from a source of fluid such as water to a manifold 11 having spray heads 12 thereon. Chemical is injected into the line 10 through a metering orifice 13. Chemical is fed to the orifice 13 from a reservoir 14 by a fluid under pressure from source line 15. A regulator valve 16 regulates the pressure fluid within the reservoir 14 and a pair of motor valves 17 and 18 are provided to open and close the inlet and outlet from the reservoir to control flow of fluid therefrom.

A deluge valve 19 in the water line normally blocks flow of water from its source and line 10 downstream of the deluge valve is normally dry. This valve 19 may be operated manually or it may be opened in response to the heat conditions in the area of manifold 11.

The manifold 11 is positioned in an area to be protected and has a plurality of spray heads 12 thereon. The spray heads 12 are of the type which draw in air as water and chemical passes through the spray heads to aerate the water and chemical and form a foam as will be understood by those skilled in the art. While only a single manifold is shown, it will be understood that line 10 may lead to a bank of manifolds protecting an area of any desired size.

A suitable reservoir 14 is provided for the chemical to be injected which preferably is Unox, a well known foam forming agent. Other chemicals may be substituted for Unox, but Unox is preferred as it makes a satisfactory foam with a very small percentage of chemical in proportion to the water with which it is mixed.

There is provided in conjunction with the chemical tank an arrangement of valves for controlling flow of chemical into the water line. Preferably, these valves include means for positively closing off flow to and from the chemical tank as well as a means for injecting a constant volume of chemical into the water line at all times.

The control arrangement preferably includes the metering orifice 13 which is sized to provide for a constant volume of chemical to be injected into the water line at all times.

The control system also includes both upstream and downstream shut-off valves, 17 and 18, to control flow of pressure fluid into reservoir 14 and to control flow of chemical from the reservoir through outlet 21 into the line 10. The line 21 should communicate with the bottom of reservoir 14 so as to always be below liquid level of the chemical therein.

The control valves 17 and 18 are preferably so arranged that they will both open when the line 10 is pressurized and close when this line is not pressurized. For this purpose, these valves may be of the diaphragm operated type, as illustrated, and have one side of the diaphragm exposed to pressure within the water line through lines 22 and 23 to valves 17 and 18 respectively. The valves 17 and 18 are preferably biased toward closed position in any conventional fashion such as by spring pressure. They should be arranged to open when pressure in line 10 exceeds a predetermined minimum and to close when pressure within line 10 is less than this predetermined minimum.

With the valves 17 and 18 open, air or any other suitable gas from source 15 is fed into the top of the Unox tank to pressurize the reservoir 14 and provide a pressure drive for driving chemical from the reservoir through the outlet orifice 13 and into the main line 10. The pressure fluid for source line 15 may be provided by instrument air readily available in an industrial plant or it may be provided by bottled pressure fluid such as nitrogen, or the like.

As both the pressure in source line 15 and the line 10 into which chemical is to be injected may vary, it will be apparent that both the pressure drive for the chemical and the back-pressure from the line into which it is to be injected may vary over a considerable range. As it is desired to inject a constant volume of chemical regardless of what the pressures are in either of these lines 10 and 15, there is provided a differential regulator valve which regulates the pressure on the chemical reservoir to provide a pressure drive which is constantly greater than the pressure within line 10 by a predetermined and preferably selected amount. For this purpose, there is provided the regulator valve 16 in the inlet line 24 for reservoir 14. Regulator valve 16 is preferably of the type in which a resilient means such as spring 25 exerts a selective constant force tending to open the valve member. In the regulator valve illustrated, the spring 25 is compressed between an adjustable carrier plate 26 and a diaphragm 27. By rotating the screw 28 which bears against the carrier plate 26, the degree of compression of spring 25 may be varied. A lock nut 29 is provided to lock the screw 28 in place. The free end of spring 25 bears against a diaphragm 27 which is exposed on its under side to pressure in the inlet 31 of the regulator valve and on its upper side to pressure from line 10. The pressure from line 10 is fed into the spring chamber through inlet 32. Thus, the pressure differential across the diaphragm 27 will always be the difference between these two pressures.

The valve member 33 of the regulator valve is arranged to close with increasing air pressure and to open with decreasing air pressure. In like manner, the pressure from line 10 tends to open the valve as it increases and to close the valve as it decreases. Thus, considering only the effect of air pressure on the regulator valve it will be seen that spring 25 can be adjusted so that a substantially constant pressure will be maintained in the reservoir with changes in air pressure as an increase in air pressure tends to move the valve member 33 toward closed position to reduce flow of air through the regulator and vice versa, a decrease in air pressure tends to open the valve member further and permit greater flow.

The pressure exerted by fluid in line 10 through inlet 32 in the spring housing 34 also influences opening and closing of valve member 33 and therefore an increase in line pressure will cause the regulator valve to open and permit build-up of a greater pressure in reservoir 14. Likewise, a decrease in pressure within spring housing 34 will cause a decrease in pressure in the reservoir 14. Thus, the regulator valve 16 is responsive to changes in pressure in line 10 and will maintain a substantially constant differential across metering orifice 13.

From the above description of operation of the regulator valve 16, it is apparent that the source of air must be under somewhat greater pressure than pressure in the water line 10. Instrument air available in factories is normally much greater than the water pressure available and also bottled gas is under a substantially greater pressure.

When the system is installed, the spring 25 is adjusted to provide a desired force on the valve member 33 which will give the desired differential across metering orifice 13 with normal water pressure in line 10 and normal air pressure in line 15. Then, when the system is placed in use, variance in the water pressure will be accompanied by changes in the reservoir pressure and therefore a constant differential will be maintained across the metering orifice 13 resulting in a constant volume of chemical being injected into the water line.

Of course, as water pressure in line 10 increases, the volume of water flowing through the line will also increase. However, due to the nature of the spray heads 12 which are used with this type of equipment, a better foam is provided with higher pressure water. That is, high head pressure pulls more air through the spray head and a better foam is produced. Therefore, a lesser relative percentage of chemical to water will provide a given quality foam and it is therefore not desired to increase the volume of chemical flowing through the metering orifice 13 with increases in water pressure. By the same token, as water pressure drops below a normal value, the quality of foam is less and therefore a greater percentage chemical is needed to maintain the quality of the foam. As pressure reduces, the volume of flow through line 10 will also reduce and therefore percentagewise the amount of chemical injected will be greater and the quality of foam will be maintained.

When deluge valve 19 is turned on to pressurize line 10, pressure fluid passes into line 22 and 23 and opens valves 17 and 18. This permits gas to flow into and begin to pressurize the reservoir 14. Pressure from line 10 within spring housing 34 is effective on diaphragm 27 and therefore the build up of pressure in reservoir 14 will be governed by the amount of pressure in line 10 and will vary with variations in pressure in line 10. As pressure builds up in reservoir 14, it provides a fluid drive for driving the chemical through line 21 past valve 17 which is now open and out through orifice 13 into line 10 where the chemical combines with the water in line 10 and passes to manifold 11. The combined water and chemical is sprayed through spray heads 12 on manifold 11 to provide the desired foam. As soon as the purge valve 19 is turned off, pressure within line 10 drops and pressure within lines 22 and 23 also drop, shutting off valves 17 and 18 to stop flow of pressure fluid into the reservoir and flow of chemical from the reservoir. At this time, the vent valve 35 in the top of the reservoir 14 may be opened to bleed off the pressure within the tank and the tank refilled with chemical. The valve 35 is then closed and the system is ready to be used again at any time purge valve 19 is turned on.

From the above it will be seen that the objects of this invention have been attained. There has been provided a system which is in operation to inject chemical into a main line only when this line is pressurized. The operation is automatic and dependent upon pressure within the line into which chemical is to be injected for opening and closing of the inlet and outlet of the chemical tank. Therefore, there can be no waste of chemical as it cannot escape from the tank except when it is to be mixed with fluid in the line 10.

There has also been provided a system in which chemical is fed through a metering orifice and the volume of chemical is maintained constant regardless of the change in the driving pressure for the chemical and the back pressure of the line into which the chemical is being introduced. Preferably, the metering orifice is a set diameter orifice and the structure is as described to maintain a constant differential across this orifice so that a constant volume of fluid will pass into the line.

From the foregoing it will be seen that this invention is one well adapted to attain all of the ends and objects hereinabove set forth, together with other advantages which are obvious and which are inherent to the system.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A system for injecting a chemical into a flow line comprising, a chemical reservoir with an outlet connected to the flow line and an inlet for fluid under pressure for driving the chemical through the outlet and into the flow line, means for closing the inlet when the pressure of the line fluid falls below a predetermined value, and pressure regulating means responsive to the pressure within the flow line to maintain the pressure of the fluid within the inlet, when open, at a predetermined substantially constant amount above the pressure within the flow line.

2. The system of claim 1 wherein a metering means is employed in the outlet to limit flow of chemical therethrough.

3. The system of claim 1 wherein a means is provided to close the outlet when the pressure within the flow line is below a selected value and to open same when said flow line pressure exceeds said value.

4. A system for injecting a chemical into a flow line comprising, a chemical reservoir with an outlet connected to the flow line and an inlet for fluid under pressure for driving the chemical through the outlet and into the flow line, means for closing the inlet when the pressure of the line fluid falls below a predetermined value and to reopen said inlet when the pressure within the flow line is greater than said value, and pressure regulating means responsive to the pressure within the flow line to maintain the pressure of the fluid within the inlet, when open, at a predetermined substantially constant amount above the pressure within the flow line.

5. A system for injecting a chemical into a flow line comprising, a reservoir for the chemical having an inlet adapted to be connected to a source of pressure fluid and an outlet adapted to be connected to the flow line, a motor valve controlling flow of pressure fluid to the reservoir in response to pressure conditions in the flow line, a regulator valve operative upon opening of said motor valve and regulating flow of pressure fluid to the reservoir in response to pressure conditions in the flow line, said regulator valve having resilient means applying a selective constant force to the valve member of the regulator valve, a second motor valve controlling flow of chemical from the reservoir in response to pressure conditions in the flow line, and means for metering flow of chemical through said outlet.

References Cited in the file of this patent

UNITED STATES PATENTS

| | | |
|---|---|---|
| 2,262,102 | Hunter | Nov. 11, 1941 |
| 2,787,281 | Word | Apr. 2, 1957 |